E. POPE.
TELEGRAPH APPARATUS.
APPLICATION FILED JUNE 14, 1915.

1,248,159.

Patented Nov. 27, 1917.

Witness:
Chas. D. King.

Inventor:
Edwin Pope.
by Andrew Wilson
Attorney.

UNITED STATES PATENT OFFICE.

EDWIN POPE, OF QUEBEC, QUEBEC, CANADA.

TELEGRAPH APPARATUS.

1,248,159. Specification of Letters Patent. Patented Nov. 27, 1917.

Application filed June 14, 1915. Serial No. 33,912.

*To all whom it may concern:*

Be it known that I, EDWIN POPE, a subject of the King of Great Britain, residing at Quebec, in the Province of Quebec and Dominion of Canada, have invented certain new and useful Improvements in Telegraph Apparatus, of which the following is a specification.

My invention relates to improvements in the means for sending and recording telegraph messages. My invention is intended for use in connection with a telegraph system in which a continuous system of current alternations is sent into a main line, selected alternations being modified in various ways to produce a plurality of systems of signals, and my improvements are directed to means for simplifying the sending, receiving and recording of the various systems of signals, all as hereinafter pointed out and claimed.

Figure 1:
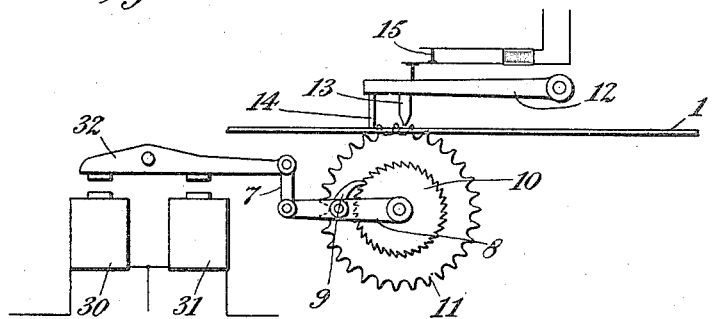
Figure 2:
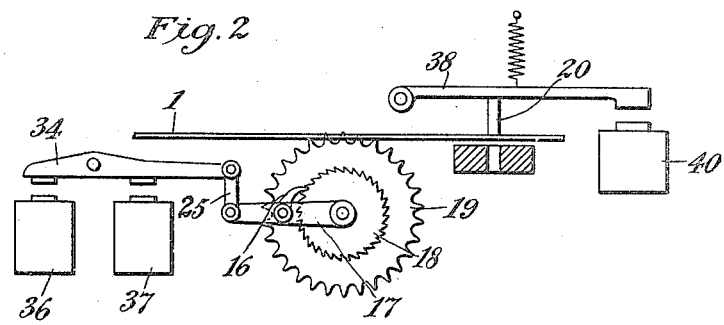
Figure 4:
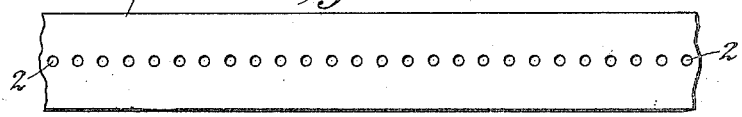
Figure 3:
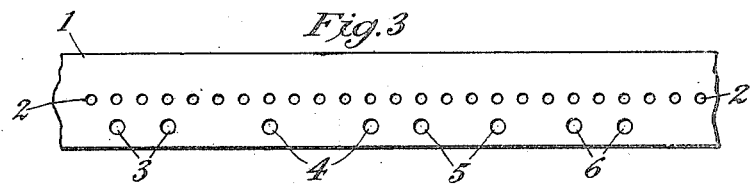

In the drawings Figure 1 is a diagrammatic representation of a sending mechanism; Fig. 2 is a similar showing of a receiving mechanism; Fig. 3 is a view of a piece of sending tape ready for use; and Fig. 4 is a view of a piece of the receiving tape ready for use.

The same reference numerals designate similar parts in all the figures.

A telegraph system of the general class above referred to is described in my Letters Patent of the United States No. 1,052,513 of February 11, 1913; and the application of my present improvements may be understood by reference to that patent, which shows how the continuous series of alternations is used to actuate the transmitting and the receiving mechanisms, and to measure the distances between the special modifications of selected impulses which constitute the several systems of signals, thereby determining the value or meaning of each signal combination. Each signal is composed of a certain number of measuring impulses combined with one or more, preferably two, modified impulses. And in sending messages into the line it is convenient to take advantage of this and to first translate the message into a diagrammatic representation of its component signal impulses, and then to cause the prepared message to be automatically passed through an apparatus which will transmit its signal values over the line.

I accomplish this by using a previously prepared tape or strip of paper or the like material, provided with a continuous series of evenly spaced feed holes and with signal holes associated therewith to form signal groups.

In the drawings 1 represents the strip of paper or tape, and 2, 2 the continuous series of feed holes therein. Special signal holes are represented by 3, 4, 5 and 6, the values of which may be illustrated as follows; the holes 3 are placed opposite the second and fourth of a series of feed holes and show the combination equivalent to the letter A; the holes 4 are placed opposite the fourth and eighth of another series of feed holes and represent the letter B; the holes 5 are placed opposite the second and fifth of another series of feed holes and represent the letter S; while the holes 6 stand for the letter H. That is to say, the continuous series of feed holes 2, 2 is separated into sub-series by associated pairs of signal holes, the first signal hole of each pair being opposite to the last feed hole of the first component of the signal, while the second signal hole of each pair is opposite the last feed hole of the second component of the signal. The number of feed holes in the different sub-series varies. Thus in the above illustration A employs four feed holes, B eight feed holes and S and H five feed holes each.

Referring now to Fig. 1 the armature 32 of the magnets 30, 31 corresponds in substance with a similar armature and pair of magnets in my said patent. The armature is shown as connected at one end by a link 7 with a pivoted arm 8, carrying a pawl 9 engaging with a ratchet wheel 10 which is associated with a toothed wheel 11 so as to turn the latter with it. A pivoted arm 12 has a cam lug 13 which rides over the teeth of the toothed wheel, but can only fully enter between the teeth when the rod or needle 14, also carried by the arm 12, passes down below the level of the tape 1.

A spring circuit breaker 15, which corresponds with one of the switches 15 or 16 of my aforesaid patent, (for instance the switch 16 at the right hand side of part 1 of Fig. 1) is kept closed so long as the needle 14 is held up by the tape 1, but will open whenever the needle 14 passes below the paper. The needle 14 registers in the line of the signal holes 3, 4, 5 &c.

It will be seen, therefore, that if a tape, punched for instance like that shown in Fig. 3, is passed over the wheel 11 so that its holes register with the teeth of the wheel, it may be fed forward, if the play of the armature 32 is properly adjusted, one feed hole space at each impulse from the magnet 30. At the first feed step the needle 14 will rest upon the tape and the circuit breaker will remain closed. But at the second feed step the needle will encounter the first signal hole of the combination A, and will drop through it, allowing the circuit breaker 16 to open and causing a neutral interval in the main line. The next feed step of the wheel 11 will raise the cam lug 13, closing the circuit breaker 15, and reëstablishing the connection of the normal negative battery with the main line. The following step of the wheel 11 will allow the needle 14 to drop through the second signal hole and thereby transmit the second signal of the A combination into the main line. And if the movement of the tape is continued the other signals upon it will be automatically sent into the line in proper sequence.

At the receiving end of the line the messages may be received and recorded in the following manner.

Referring now to Fig. 2 it will be seen that the armature 34 (which may be taken as corresponding with the last armature 32 in part 3 of Fig. 1 of my said patent) is caused, by magnets 36 and 37, to feed forward a toothed wheel 19, through a link 25, arm 17, pawl 16 and ratchet wheel 18, in the same way that the wheel 11 is turned. The teeth of the wheel 19 register with the holes 2 in the prepared tape 1, (Fig. 4) and advance it one step at each feed movement of the armature.

The magnet 40 which may correspond with the magnet 28 appearing near the armature last referred to, in my said patent, actuates an armature 38 which is provided with a punch 20 adapted to encounter the tape 1 in a line corresponding with the line of the signal holes 3 to 6. If, therefore, between the movements of the wheel 19, the magnet 40 is energized by the passage into the circuit of its appropriate signal, it will draw down its armature and cause its punch 20 to punch a signal hole in the tape. The deënergizing of the magnet 40, by the next movement of the polar relay of its circuit, for instance the relay 4 of my aforesaid patent, will release the armature 38, allowing it to rise and free its punch from the tape, which may be again fed forward by the next movement of the feed wheel 19; and the succeeding signals of the message may be punched in the tape in a similar way in their proper order.

It will be seen that the receiving tape becomes an exact reproduction of the punched sending tape, and that it may be used to retransmit the message into another circuit.

In this way I employ the same type of tape for sending and receiving messages, the series of feed holes in each case governing the step by step movement of the tape, while the values of the signal holes are determined by their positions in relation to the feed holes. The feed holes do not govern impulses nor do the signal holes affect the feeding of the tape.

It will be readily understood that modifications and variations may be made without departing from the spirit of my invention, by the use of equivalents or of other means familiar to those skilled in the art.

Having thus described my invention what I claim and desire to secure by Letters Patent of the United States is:

1. A telegraph tape, for use in connection with a system employing a continuous series of current alternations, provided with a continuous series of equidistant feeding perforations, and with a single associated series of pairs of signal perforations forming a complete alphabetical system.

2. A telegraph tape, for use in connection with a system employing a continuous series of current alternations, provided with a continuous series of equidistant feeding perforations, and with a single associated series of pairs of signal perforations forming an alphabetical system, the values of the signal perforations being determined by the number of the intervening feeding perforations.

3. A telegraph tape, for use in connection with a system employing a continuous series of current alternations, provided with a continuous series of equidistant feeding perforations, and with an associated series of signal perforations, each signal group embracing a plurality of feeding perforations and not more than two signal perforations, and such signals forming a complete alphabetical system.

4. A telegraph tape, for use in connection with a system employing a continuous series of current alternations selected impulses of which may be varied in strength, provided with a continuous series of measuring perforations adapted to interpret the impulses of one polarity irrespective of strength, formed into a succession of signal groups by having not more than two signal perforations, representing the impulses of the other polarity and of varied strength, associated with a plurality of the measuring perforations to form each group, such signal groups forming a complete alphabetical system.

5. A telegraph tape, for use in connection with a system employing a continuous series of impulses of opposed polarity, variable as to the length of intervals between them, provided with a continuous series of measuring perforations adapted to interpret impulses of one polarity, formed into signal groups by having associated therewith for each group not more than two selected perforations adapted to interpret variations of length between impulses, and such signal groups forming a complete alphabetical system.

EDWIN POPE.

Copies of this patent may be obtained for five cents each, by addressing the "Commissioner of Patents, Washington, D. C."